ELECTROLUMINESCENT STORAGE SYSTEMS

Filed June 28, 1961 2 Sheets-Sheet 1

INVENTOR
S. L. LINDER
BY H. L. Logan
ATTORNEY

INVENTOR
S. L. LINDER
BY H. L. Logan
ATTORNEY

United States Patent Office 3,085,231

Patented Apr. 9, 1963

3,085,231

ELECTROLUMINESCENT STORAGE SYSTEMS

Solomon L. Linder, Morristown, N.J., assignor to Bell Telephone Laboratories Incorporated, New York, N.Y., a corporation of New York Filed June 28, 1961, Ser. No. 120,218
7 Claims. (Cl. 340—173)

This invention relates to electroluminescent screen arrangements and in particular to such arrangements which excite the screens by energizing matrices of electrical conductors.

Certain types of phosphors emit light when in the presence of an electrical field. This phenomenon has been used to advantage in binary information storage systems found in the prior art. A typical system of this type includes a matrix-type screen comprising a layer of electroluminescent material placed between a first array of parallel conductors and a second array of parallel conductors crossing the first array of conductors. When storing information, a transparent slide having a suitable photoemulsion is placed in front of the screen. The slide is then exposed by energizing selected pairs of crossing conductors so that light is emitted from the electroluminescent material in the areas where the energized conductors cross one another. After the exposed slide is developed, the slide has a pattern of opaque and transparent areas representing stored binary information. Information is read from a slide containing information by placing the slide in front of the screen and energizing selected conductors so that light is emitted by an area of the screen corresponding to the area of the slide to be interrogated. When the interrogated area is transparent, light is passed through the slide whereas when the interrogated area is opaque, light is not passed through the slide. A light sensing device indicates when light is passed through the slide thus indicating the binary information stored on the interrogated area of the slide.

In storage systems of the above-described type, light is emitted at the crosspoint of a pair of energized conductors. A lower intensity light is, however, emitted along remaining portions of the energized conductors. Furthermore, because the light output of the electroluminescent material bears a nonlinear relationship to the applied voltages, the ratio between the intensity of the light emitted at the crosspoint and the intensity of the light emitted along remaining portions of the energized conductors decreases as the crosspoint light intensity is increased. It is therefore desirable to operate the screen at the lowest light intensity possible in order to obtain the best discrimination between the crosspoint light and the remaining light.

Discrimination generally does not present a problem when storing information because high speed photoemulsions, which are responsive to low intensity light, may be used on the slides. Unfortunately, light sensing devices used for reading stored information are not as sensitive as some photoemulsions. During readout, therefore, the light intensity of the screen must be increased with a resulting loss in discrimination ratio. This problem has been overcome somewhat by increasing the electroluminescent areas affected by the crosspoints so that the same intensity of light may be obtained at lower energizing potentials. This expedient, however, requires larger screens and slides in order to store the same amount of information.

Application Serial No. 853,043, filed November 16, 1959, by C. W. Hoover, Jr., discloses several storing arrangements using matrix-type electroluminescent screens in which the above-described loss in discrimination during readout is substantially reduced. In general, each of these arrangements applies a signal at a first frequency to one of the conductors leading to a selected crosspoint and a signal at a second frequency to the other conductor leading to the same crosspoint. As mentioned previously, the light output of the electroluminescent material is nonlinearly related to the applied voltages. This characteristic causes the light emitted at the selected crosspoint to be modulated at the cross-product modulation frequencies of the applied signal frequencies. Remaining portions of the energized conductors, however, emit substantially no light at these cross-product frequencies. Because a light detecting device detects all of the light passed through a slide placed in front of the screen, the output of the light detecting device may be modulated at a number of frequencies including the cross-product frequencies. By passing the output from the light sensing device through a circuit tuned to one of the cross-product frequencies, such as the sum or the difference frequency, much improved discrimination between the light emitted by a crosspoint and the light emitted along the remaining portions of the energized conductors is achieved.

Although the arrangements disclosed in the Hoover application provide a substantial discrimination improvement, it has been found that a discrimination problem sometimes exists when not-too-sensitive light sensing devices are used. In particular, it has been found that some light modulated at the cross-product frequencies is, in fact, emitted by the energized conductors at points other than the selected crosspoint. Although it is not definitely known why this takes place, it is believed that it is caused by capacitive coupling between conductors which causes a phase-shifted fraction of the signal voltages to appear on the conductors parallel to the energized ones. When, therefore, the light intensity at the selected crosspoint is increased to accommodate a not-too-sensitive light sensing device, the light output at the cross-product frequencies along remaining portions of the energized conductors also increases. As previously discussed, the nonlinear characteristic of the electroluminescent material causes the discrimination ratio to decrease as the intensity is increased. It is therefore possible for a discrimination problem still to exist.

It is an object of the present invention to further improve the discrimination ratio in electroluminescent screen arrangements.

In accordance with the present invention in one of its broader forms, the discrimination ratios in arrangements of the type disclosed in the above-identified Hoover application are improved by injecting additional signals into the energized conductors. In particular, when a pair of matrix conductors are respectively energized by a pair of distinct frequency signals, a phase-shifted portion of the energizing signal applied to a first of these conductors is applied to the second of the energized conductors while a phase-shifted portion of the energizing signal applied to the second conductor is applied to the first conductor. Each of the conductors, therefore, is energized by a distinct frequency signal plus a phase-shifted portion of the distinct frequency signal applied to the other conductor. These phase-shifted signals at least partially cancel the effects of the signals appearing on the inactive leads of the matrix so that the cross-product frequency light appearing along the energized conductors at other than the desired crosspoint is substantially reduced. Because screen characteristics may vary from unit to unit, the amplitudes and phase relationships of these cross-coupled signals are adjusted to produce a maximum discrimination ratio. In one of the less complex embodiments of the present invention, a discrimination ratio improvement of approximately ten decibels was obtained.

The present invention may also be used to advantage in the multiple access arrangement disclosed in the previously mentioned Hoover application. In this multiple access arrangement, a first frequency signal is applied to a lead in one of the coordinates of a matrix while a plurality of distinct frequency signals are applied to respective leads in the other coordinate of the matrix. A corresponding plurality of output circuits are tuned to respectively detect signals produced by the cross modulation of the first frequency signal with each signal in the plurality of signals, thus permitting a number of storage areas to be interrogated simultaneously. In accordance with the present invention, the discrimination ratio of this multiple access arrangement may also be improved by applying a phase-shifted portion of the first frequency signal to each of the other energized leads while applying phase-shifted portions of each of the distinct frequency signals to the first frequency signal lead.

In several embodiments of the invention, a phase-shifted portion of each of the signals is added to the other signal by impedance networks connected between the output leads of the signal generators. In one of the simplest of the embodiments, the impedance network comprises a serially connected resistor and capacitor connected between the ungrounded output leads of the generators. Although this embodiment cannot produce the same phase shift and attenuation for both signals (because of the difference in frequency of the signals), it improves the discrimination ratio in some applications to a satisfactory level. The discrimination ratio is further improved in another embodiment of the invention in which a lattice network is connected in the ungrounded leads of the generators. In still another embodiment of the invention, a first amplifier and impedance network combination couples a phase-shifted portion of the first generator output signal into the output signal lead of the second generator while a second amplifier and impedance network combination couples a phase-shifted portion of the second generator output signal into the output signal lead of the first generator. Although this last mentioned embodiment employs active devices whereas the first two embodiments do not, the one-way transmission characteristics of these devices permit still better control over the signals coupled between the generator outputs.

Other objects and features of the invention will become apparent from a study of the following detailed description of several embodiments.

Figures 1, 2:
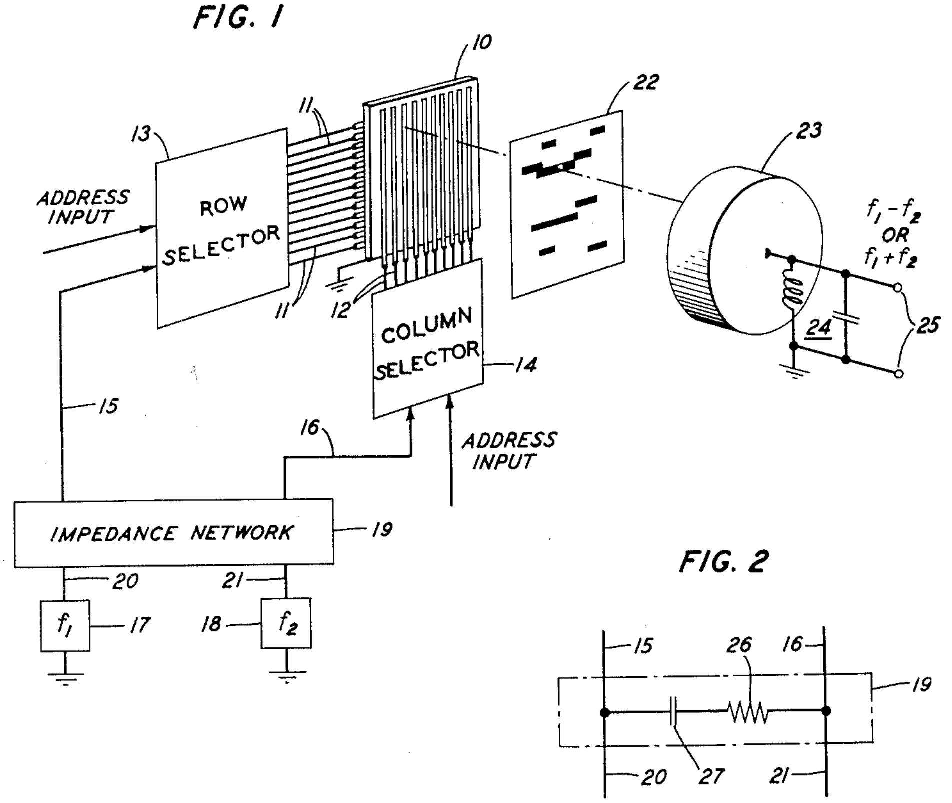
FIG. 1 shows a block diagram illustrating the principles underlying the invention.
FIGS. 2, 3 and 4 show schematic diagrams of circuit arrangements which may be used to practice the invention.

The embodiment of the invention illustrated in FIG. 1 includes a matrix-type electroluminescent screen 10 having a first plurality of access leads 11 and a second plurality of access leads 12. To facilitate the description, access leads 11 are shown and referred to as row leads while access leads 12 are shown and referred to as column leads. A row selector 13 and a column selector 14 are connected to row leads 11 and column leads 12, respectively. Selectors 13 and 14, which are conventional in nature and may include gating circuits, are responsive to address input signals to apply signals appearing on a pair of leads 15 and 16 to distinct row and column leads 11 and 12, respectively. The signals appearing on leads 15 and 16 are produced as a result of a pair of generators 17 and 18 and an impedance network 19 connected between generator output leads 20 and 21 and leads 15 and 16. Generators 17 and 18 produce signals at distinct frequencies $f_1$ and $f_2$, respectively. Impedance network 19 causes signals at frequencies $f_1$ and $f_2$ to appear on leads 15 and 16, respectively, as the basic or primary signals on these leads. In accordance with the invention, impedance network 19 also causes phase-shifted portions of the signals at frequencies $f_1$ and $f_2$ to appear as secondary signals on leads 16 and 15, respectively. In other words, appearing on each of the leads 15 and 16 is a primary signal at a distinct frequency plus a secondary signal which is a phase-shifted portion of the primary signal appearing on the other lead.

Light emitted by screen 10 impinges upon an information storage slide 22. Slide 22 includes transparent and opaque areas representing stored binary information. Light passed by slide 22 impinges upon a light sensing device 23 which produces an output signal modulated in accordance with the intensity of the light. Light sensing device 23 may comprise, for example, a conventional phototube and amplifier arrangement.

As in the previously mentioned Hoover application, the light emitted at the crosspoint of the energized row and column conductors is modulated at the cross-modulation frequencies of the signals appearing on the conductors. In addition to the light emitted at the selected crosspoint, light modulated at frequencies $f_1$ and $f_2$ is also emitted along the selected conductors. Because light sensing device 23 is responsive to virtually all of the light passed by slide 22, the output of device 23 at frequencies $f_1$ and $f_2$ is discriminated against by a tuned circuit 24. Circuit 24 is tuned to resonate at one of the cross-modulation products of the energizing signals, such as the sum or difference frequency signal. The signal appearing across circuit 24 is made available at a pair of output terminals 25.

As discussed previously, a problem sometimes occurred in the Hoover arrangements because capacitive coupling between parallel conductors of a matrix apparently causes phase-shifted portions of the signals appearing on selected conductors of the matrix to be coupled to the conductors parallel to them. Such signals cause low level light modulated at the same frequencies as that emitted at the selected crosspoint to be emitted at other crosspoints along the selected conductors. This, as discussed previously, sometimes resulted in unsatisfactory discrimination between the light emitted by the selected crosspoint and light emitted at other crosspoints. In accordance with the present invention, the conflicting light emitted at crosspoints other than the selected crosspoint is substantially reduced by the secondary signals appearing on the selected conductors as a result of impedance network 19. In particular, the secondary signal appearing on each selected conductor is approximately in phase with and has approximately the same amplitude as the capacitively coupled signals appearing on the unselected conductors crossing the selected conductor. Because of this relationship, the secondary signal on each selected conductors tends to cancel the effects of the signals on the unselected crossing conductors so that the light emitted at the unselected crosspoints in reduced.

Figure 3:
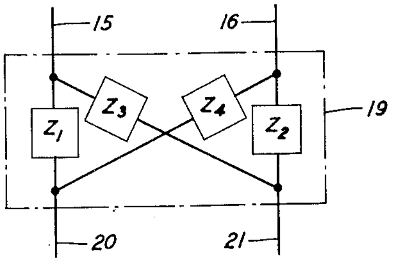
Figure 4:
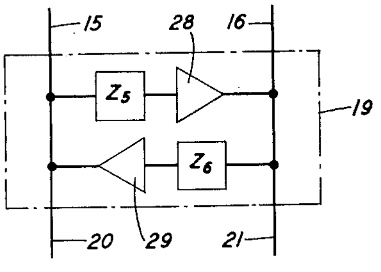

FIGS. 2, 3 and 4 each shows an arrangement that may be used for impedance network 19. In FIG. 2, leads 15 and 16 are connected directly to leads 20 and 21, respectively, while a resistor 26 and a capacitor 27 are connected in series between leads 20 and 21. The values of resistor 26 and capacitor 27 are chosen to produce a maximum discrimination ratio. It will be noted that the use of this arrangement may involve a compromise in adjusting the values of the components because the network cannot produce the same phase shift and attenuation for both signals because of the difference in frequency between the signals. The arrangement, however, is economical and in many applications improves the discrimination ratios to satisfactory levels.

The arrangement disclosed in FIG. 3 comprises a lattice network connected between leads 15, 16, 20 and 21.

The network impedances $Z_1$, $Z_2$, $Z_3$ and $Z_4$ may be complex in nature as appreciated by those skilled in the art. In many applications, impedances $Z_1$ and $Z_2$ are large compared to the generator impedances, impedances $Z_3$ and $Z_4$ are large compared to impedances $Z_1$ and $Z_2$ and impedances $Z_3$ and $Z_4$ are small compared to the screen impedances. The values of the impedances may be changed to change the phases and amplitudes of the cross-coupled signals somewhat independently of each other.

In the network of FIG. 4, lead 20 is connected directly to lead 15 while lead 21 is connected directly to lead 16. An impedance $Z_5$ and an amplifier 28 are serially connected between leads 20 and 21 so that a phase-shifted portion of the signal appearing on lead 20 appears on lead 21 while an impedance $Z_6$ and an amplifier 29 are serially connected between leads 21 and 20 so that a phase-shifted portion of the signal on lead 21 appears on lead 20. Impedances $Z_5$ and $Z_6$ may be complex in nature while amplifiers 28 and 29 may have gains of less than unity. Although this arrangement includes active elements in the form of amplifiers, the one-way coupling nature of each cross-coupling path has the advantage of permitting, in many applications, higher discrimination ratios to be obtained than are obtainable with the previously described arrangements of FIGS. 2 and 3.

Figure 5:
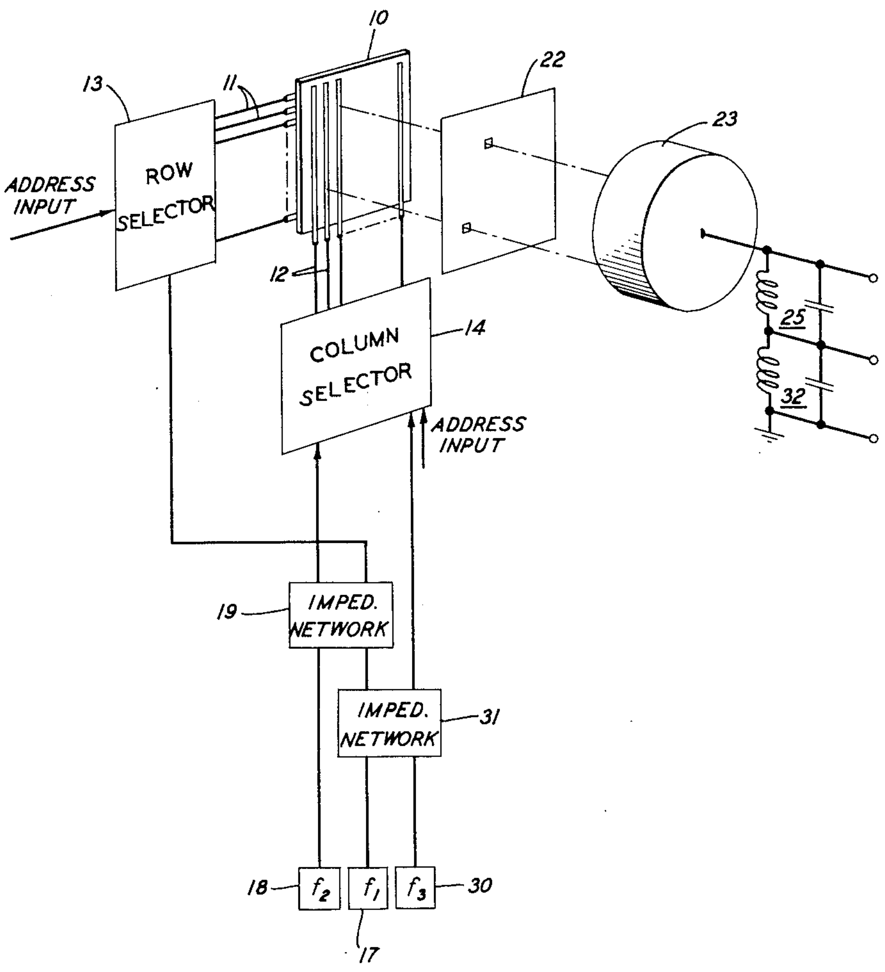
FIG. 5 shows another block diagram illustrating the principles of the invention.

Another embodiment of the invention is illustrated in FIG. 5. In this embodiment, two areas of a screen may be interrogated simultaneously. As in the embodiment of FIG. 1, a pair of distinct frequency input signals are applied to respective row and column conductors while a phase-shifted portion of each signal is coupled into the other conductor. This embodiment differs from that of FIG. 1 as a third signal at still another frequency $f_3$ is produced by a generator 30 and applied to another column conductor. A second impedance network 31 couples a phase-shifted portion of the signal at frequency $f_1$ into the same conductor as the signal of frequency $f_3$ and a phase-shifted portion of the signal at frequency $f_3$ into the same conductor as the signal at frequency $f_1$. Because three frequencies are used, light modulated at a first set of cross-product frequencies is emitted at a first crosspoint while light modulated at a second set of cross-product frequencies is emitted at a second crosspoint. Light sensitive device 23 responds to the light modulated at the two sets of cross-product frequencies. Connected to the output of light sensitive device 23 are a pair of tuned circuits 25 and 32. One of these circuits is tuned to resonate at one of the frequencies of the first set of cross-product frequencies while the other is tuned to resonate at one of the frequencies of the other set of cross-product frequencies. The cross coupling provided by networks 19 and 31 (which may take the form of those disclosed in FIGS. 2, 3 and 4), improves the discrimination ratios in a manner identical to that described with respect to FIG. 1.

Numerous other arrangements embodying the present invention may be devised by those skilled in the art without departing from the spirit and scope of the present invention. The present invention is not restricted, for example, in the number of different frequency input signals that may be used.

What is claimed is:

1. In combination, a matrix-type electroluminescent screen having first and second groups of access conductors, means for applying an input signal at a first frequency and a phase-shifted portion of an input signal at a second frequency to a selected one of said conductors in said first group and said input signal at said second frequency and a phase-shifted portion of said input signal at said first frequency to a selected one of said conductors in said second group, and means positioned to receive light from said screen and producing an output signal in response to light modulated at one of the cross-product frequencies of said first and second frequencies.

2. A combination in accordance with claim 1 in which an information storage slide having a plurality of transparent and opaque areas corresponding to stored binary information is placed between said screen and said means positioned to receive light from said screen.

3. In combination a matrix-type electroluminescent screen having first and second groups of access conductors, a first source of signals at a first frequency, a second source of signals at a second frequency distinct from said first frequency, means for applying said signal at said first frequency and a phase-shifted portion of said signal at said second frequency to a selected one of said conductors in said first group and said signal at said second frequency and a phase-shifted portion of said signal at said first frequency to a selected one of said conductors in said second group, and means positioned to receive light from said screen and producing an output signal in response to light modulated at one of the cross-product frequencies of said first and second frequencies.

4. A combination in accordance with claim 3 in which an information storage slide having a plurality of transparent and opaque areas corresponding to stored binary information is placed between said screen and said means positioned to receive light from said screen.

5. In combination a matrix-type electroluminescent screen having first and second groups of access conductors, a first source of signals at a first frequency, a second source of signals at a second frequency distinct from said first frequency, a first lead, a second lead, means applying at least a portion of said signal at said first frequency and a phase-shifted portion of said signal at said second frequency to one of said leads and at least a portion of said signal at said second frequency and a phase-shifted portion of said signal at said first frequency to the other of said leads, first selector means for applying the signals appearing on one of said leads to a selected one of said conductors in said first group, second selector means for applying the signals appearing on the other of said leads to a selected one of said conductors in said second group and means positioned to receive light from said screen and producing an output signal in response to light modulated at one of the cross-product frequencies of said first and second frequencies.

6. A combination in accordance with claim 5 in which an information storage slide having a plurality of transparent and opaque areas corresponding to stored binary information is placed between said screen and said means positioned to receive light from said screen.

7. In combination a matrix-type electroluminescent screen having first and second groups of access conductors, a first source of signals at a first frequency, a second source of signals at a second frequency distinct from said first frequency, a first lead, a second lead, means connected between said sources and said leads to produce on said first lead at least a portion of said signal at said first frequency and a phase-shifted portion of said signal at said second frequency and on said second lead at least a portion of said signal at said second frequency and a phase-shifted portion of said signal at said first frequency, first selector means for applying the signals appearing on said first lead to a selected one of said conductors in said first group, second selector means for applying the signals appearing on said second lead to a selected one of said conductors in said second group, an information storage slide having information stored thereon in the form of areas of different opacity, light sensitive means for generating electrical signals in response to light transmitted from said screen through said slide, and output circuit means connected to said light sensitive means and responsive to a cross-modulation product of said first and second frequencies.

No references cited.